UNITED STATES PATENT OFFICE.

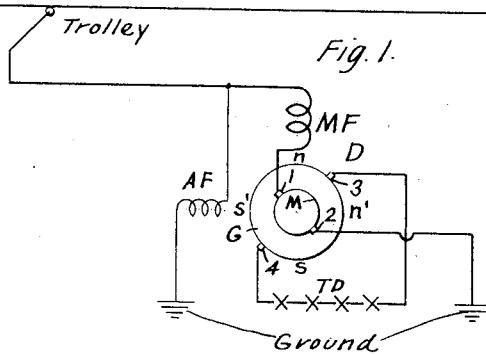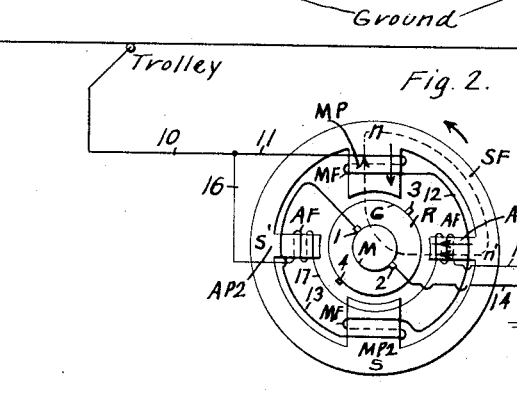

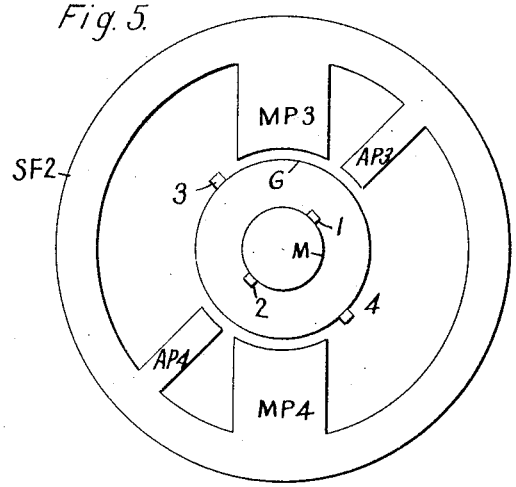
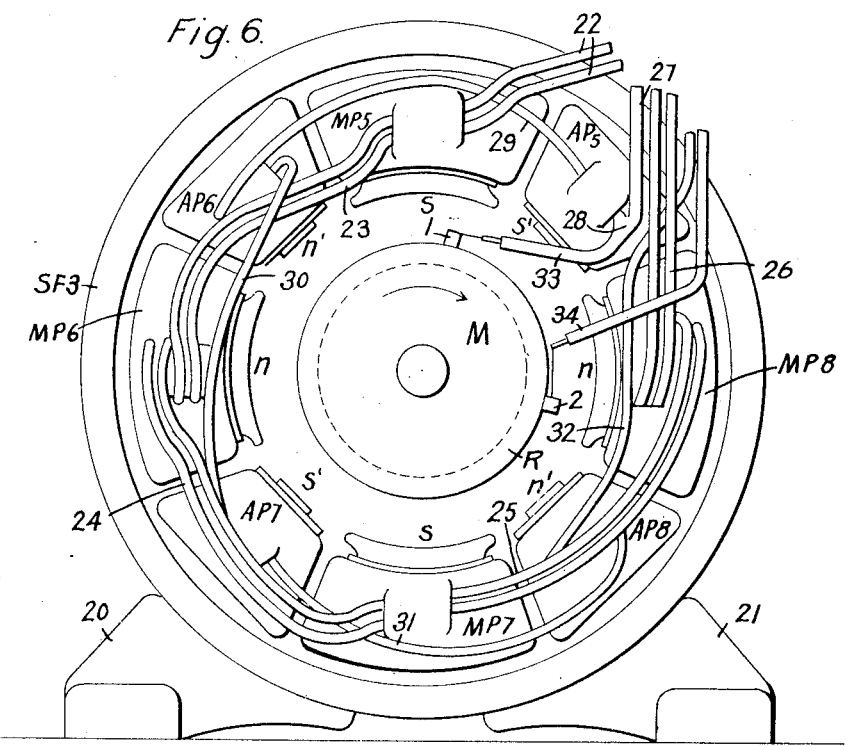

RUDOLF E. HELLMUND, OF PITTSBURGH, AND RALPH E. FERRIS, OF SWISSVALE, PENNSYLVANIA, ASSIGNORS TO WESTINGHOUSE ELECTRIC AND MANUFACTURING COMPANY, A CORPORATION OF PENNSYLVANIA.

DYNAMO-ELECTRIC MACHINE.

1,351,036.   Specification of Letters Patent.   Patented Aug. 31, 1920.

Application filed May 8, 1916. Serial No. 96,051.

*To all whom it may concern:*

Be it known that we, RUDOLF E. HELLMUND, a subject of the Emperor of Germany, and a resident of Pittsburgh, in the county of Allegheny and State of Pennsylvania, and RALPH E. FERRIS, a citizen of the United States, and a resident of Swissvale, in the county of Allegheny and State of Pennsylvania, have invented a new and useful Improvement in Dynamo-Electric Machines, of which the following is a specification.

Our invention relates to dynamo-electric machines and especially to the construction of machines of the dynamotor type.

One object of our invention is to provide a machine of the above-indicated character which shall be relatively simple and inexpensive in construction and effective and reliable in operation, and which shall embody means for effecting a variation of the voltage ratio between the two commutators, or the equivalent, of the machine under predetermined conditions in a novel manner, as hereinafter more fully set forth.

A further object of our invention is to provide a machine of the character designated wherein, upon an increase in the load current, the speed of rotation is reduced but the generator field is simultaneously increased, so that the output electromotive force is maintained constant or slightly increased. Similarly, with a decrease in applied voltage, the speed of rotation is reduced but the generator field is correspondingly increased, permitting the maintenance of the output electromotive force at a substantially constant value.

A further specific object of our invention is to provide a machine of the above-indicated class which shall embody a plurality of series-connected field windings for accomplishing the desired results, the polar projections that are associated with one field winding being normally in the customary unsaturated condition, whereby the flux created by such field winding varies in accordance with the machine load, and the polar projections upon which the other field winding is wound being normally magnetically saturated to such a degree that the effective flux emitted thereby is substantially constant, irrespective of changes in the machine load, that is, in the associated field-magnet winding.

In connection with auxiliary field excitation in regenerative systems and in various other systems, it is often desirable to obtain, from a relatively high supply-circuit voltage, a low excitation voltage, and the well-known type of dynamotor is generally employed for such purpose. The dynamotor has various advantages over an equivalent motor-generator set by reason of its lightness of weight and relatively low cost and also because it is at times desirable to have the secondary voltage, that is, the lower voltage of the dynamotor, respond rapidly to any change in the primary voltage. The desired rapidity is possible only when the field fluxes that induce the primary and the secondary voltages are identical, as is the case in a dynamotor. However, the standard dynamotor has the disadvantage that it does not permit of a change of the ratio between its high and low voltages. In some instances it may be desirable to provide a rising-voltage characteristic in the output or low-voltage circuit of the dynamotor and, in other cases, to supply a constant voltage characteristic.

The standard type of dynamotor employs a plurality of main polar projections and, in some cases, a plurality of auxiliary or commutating polar projections, the sets of brushes on the respective commutators being disposed intermediate the main polar projections or in alinement with the commutating polar projections, in accordance with familiar practice. In one form of our present invention, we so dispose the main polar projections and a plurality of auxiliary polar projections that their respective axes are located intermediate spaced pairs of non-corresponding brushes, that is, the brushes on the different cylinders.

The broad idea of adjusting the operating characteristics of a dynamotor by providing operating fluxes for the motor and generator windings which are produced by the cumulative and differential combination of two component fluxes respectively is disclosed in a co-pending application of R. E. Hellmund, Serial No. 66,725, filed December 14, 1915, wherein various types of dynamotor structures are illustrated and described for performing the desired functions. However, in all of the illustrated modifications, the relative location and arrangement of field windings is such that predetermined shunt characteristics are imparted to the machine, whereby the tendency toward undue distortion of the field flux by armature reaction under emergency conditions, such as the sudden resumption of supply-circuit energy after an interruption thereof, may cause an abnormally high voltage between commutator segments and resultant "flash-over" conditions. In our present invention, the arrangement of field windings is such as to obviate to a great extent the above-mentioned undesirable possibilities and thus render the machine substantially free from liability to "flash-over" troubles.

In the accompanying drawings, Figure 1 is a simplified diagrammatic view of a dynamo-electric machine constructed and connected in circuit in accordance with our invention; Fig. 2 is a somewhat less diagrammatic view serving to illustrate the arrangement of brushes, field windings and polar projections of the machine that is illustrated in Fig. 1; Fig. 2A is a chart serving to set forth certain flux relations in the machine under consideration; Fig. 3 and Fig. 4 are diagrammatic views, corresponding to Fig. 1, of modifications of our invention; Fig. 5 is a semi-diagrammatic view showing the relation between a modified form of field-magnet structure and the rotor of the dynamotor; and Fig. 6 is a view, in end elevation, of a dynamotor constructed to embody the features of our invention.

Referring to Fig. 1 and Fig. 2 of the drawing, the apparatus shown comprises a plurality of suitable supply-circuit conductors respectively marked "Trolley" and "Ground"; and a dynamo-electric machine D of the dynamotor type comprising a rotor R and a stator frame SF. The rotor R, in general, is of a familiar type embodying a pair of separate and distinct armature windings (not shown) that are respectively associated with a current-collecting or motor commutators M and a current-delivering or generator commutator G that are preferably disposed at opposite ends of the rotor, in accordance with a familiar practice. A pair of brushes 1 and 2 are located substantially 180 electrical degrees apart upon the motor commutator M; and a second pair of brushes 3 and 4 bear upon the generator commutator G, and, instead of being alined with the other brushes 1 and 2, are angularly spaced therefrom a material amount, for a purpose to be described.

The stator frame SF comprises a suitable supporting magnetizable yoke which is provided with a pair of oppositely-disposed, inwardly-extending main polar projections MP1 and MP2 and a second pair of auxiliary polar projections AP1 and AP2 that are respectively disposed in quadrature relation to the main polar projections. It will be observed that the main and the auxiliary polar projections have their axes lying intermediate the spaced pairs of non-corresponding brushes; for example, in the system shown, the axes of the main polar projections extend through a point intermediate non-corresponding brushes 1 and 3 and a second point intermediate the non-corresponding brushes 4 and 2; while the auxiliary polar projections have their axes lying intermediate the pairs of brushes 3 and 2, and 1 and 4, respectively.

The dynamotor stator is provided with a main field winding MF that is connected in series relation with the armature winding corresponding to the motor commutator M across the supply circuit, while an auxiliary field winding AF is directly connected to the supply-circuit conductors, as clearly shown in Fig. 1. Said main field winding is designed to, at all times, set up a stronger magnetomotive force than the auxiliary field winding.

A plurality of translating devices TD, which represent any suitable generator load for the dynamotor, such as car lights or control systems, etc., are shown as connected to brushes 3 and 4 which bear upon the generator commutator G. It will be understood that the translating devices TD may be varied in number or nature so as to provide a variable generator load, such as will be normally obtained in practice.

The main field winding MF is included in a circuit that extends from the trolley through conductors 10 and 11, the portion of the main field winding that is disposed upon the main polar projection MP1, conductor 12, the remaining portion of the main field winding that is wound upon the main polar projection MP2, conductor 13, brush 1, motor commutator M and the armature winding (not shown) that is associated therewith, brush 2 and conductors 14 and 15 to the negative conductor Ground. Another circuit is established from the conductor 10 through conductor 16, the portion of the auxiliary field winding AF that is wound upon the auxiliary polar projection AP2, conductor 17, the remaining portion of the auxiliary field winding that is disposed upon the auxiliary polar projection AP1 and conductor 18 to the negative conductor 15.

The main field winding MF is disposed around the main polar projections MP1 and MP2 in such manner as to produce north and south poles of magnetism therein, as indicated by the letters $n$ and $s$, respectively, while the auxiliary field winding AF is similarly related to the auxiliary polar projections AP1 and AP2, as designated by the characters $n'$ and $s'$, respectively.

It will be observed that, since the polar projections MP1 and AP1 provide north magnetic poles, the back electromotive force appearing at the motor commutator M is proportional to the sum of the main and the auxiliary polar fluxes, while the electromotive force appearing at the generator commutator G, is proportional to the difference of the main and auxiliary polar fluxes by reason of the fact that the fluxes tend to pass intermediate brushes 3 and 4 in opposing directions and, consequently, the voltage of the motor commutator M varies directly with a change of current in the circuit of the translating devices TD which, of course, causes a corresponding variation in the motor current of the dynamotor; whereas, the voltage of the generator commutator G varies inversely with such current changes.

It will be understood that, although, for the sake of clearness and simplicity, a two-pole machine is illustrated, our invention is not so restricted in its application. Moreover, the dynamotor may be employed for other purposes than those illustrated, if desired; for example, to drive an air-compressor, as is customary practice, whereby the machine load will vary not only in accordance with the energy demands of the translating device circuit but also in accordance with the operation of the air-compressor. Furthermore, although, in Figs. 3 and 4, the dynamotor D is illustrated diagrammatically without the stator frame SF, it will be understood that such a structure is necessarily employed in the machines to be described.

Assuming the arrangement and location of parts to be as illustrated in Fig. 1 and Fig. 2, the operation of the machine may be briefly described as follows: Since the auxiliary field winding AF is energized directly from the supply circuit, whereas the main field winding MF is connected in circuit with the motor armature winding, it follows that the field winding AF maintains a substantially constant effective field flux, while the main field winding MF produces a flux that varies in accordance with the total machine load.

Assuming the main field to provide ten ampere turns and the auxiliary field to provide five ampere turns, the total motoring field will be fifteen, and the resultant motor field will have a ratio of fifteen to five to the resultant generator field, since the motoring field is produced by the additive combination of the main and auxiliary fields and the generator field is produced by the subtractive combination thereof. Let it now be assumed that the load current is increased to such an extent that the main field excitation rises to fifteen ampere turns. The corresponding motor field will bear the ratio of twenty to ten to the corresponding generator field or, in other words, the generator field is now one-half the motor field, whereas it was formerly one-third thereof. The increase in the motor field of $33\frac{1}{3}\%$ has lowered the speed of rotation by a corresponding amount but the doubling of the generator field has more than compensated for the tendency to lower the output voltage produced by the drop in speed of rotation and thus the net effect is to produce an increase in the output electromotive force with an increase in load, as is desired in over-compounding.

Similarly, let it be assumed that the trolley voltage decreases, with constant load. The auxiliary field excitation is reduced and the speed of the dynamotor drops until the back electromotive force thereof has reduced sufficiently to permit an equal or greater motor current to traverse the device. If, as before, the main field excitation be assumed at ten ampere turns and the auxiliary field excitation at five ampere turns, the effect brought about through the auxiliary field alone may first be considered.

A drop of trolley voltage of 20% would cause the auxiliary excitation to fall to four ampere turns while maintaining the main excitation constant. Thus the total motor field is proportional to fourteen when the resultant generator is proportional to six, or in other words, the ratio of the generator field to the motor field has increased from five to fifteen to six to fourteen, this increase in the generator field being sufficient to partially or wholly overcome the effect of the drop in speed of rotation and to permit the maintenance of a substantially constant electromotive force.

It is obvious that the maintenance of a constant output electromotive force with constant load necessitates an increase in the current taken from the trolley and thus let it be assumed that the main field excitation rises to twelve ampere turns when the auxiliary excitation falls to four ampere turns. The resultant generator turns bears a ratio to the resultant motor field of eight to sixteen, thus showing still further the voltage-compounding effect of a dynamotor constructed in accordance with our invention.

The machine just described is further adapted to inherently prevent "flash-over" conditions by reason of the relative arrangement of main and auxiliary polar projections with respect to the brushes 1 and 2 of the motor commutator cylinder. As indicated by the solid arrows in Fig. 2A, the main polar projection MP1 and the auxiliary polar projection AP1, which are of north magnetic polarity, creates fluxes which travel from the stator frame SF through the polar projections to the rotor R. The armature-reaction or cross-field flux, however, tends to oppose the flux that is emitted by the main polar projection MP1, in accordance with a familiar principle; but, by reason of the peculiar location of the auxiliary polar projection AP1, such cross-field flux traverses that polar projection in the same direction as does the auxiliary polar flux itself. The path of the cross-field flux in question is indicated by dotted lines in Fig. 2 and Fig. 2A.

The location of the main and auxiliary polar projections with respect to the brushes 1 and 2 may be specifically described as follows: Assuming the direction of rotation of the rotor R to be as indicated by the curved arrow in Fig. 2, it will be noted that the auxiliary polar projections AP1 and AP2 are disposed near the forward or toe portions of the brushes 2 and 1, respectively, whereas the main polar projections MP1 and MP2, being disposed intermediate the auxiliary polar projections, of course, are respectively located near the rear or heel portions of the brushes 1 and 2, respectively.

Assuming a sudden resumption of supply-circuit voltage after a temporary interruption thereof, the flux that is produced by restored armature current has tended to assume abnormal proportions in most machines of the prior art and has, consequently, effected an undue distortion of the simultaneous field flux, which has usually taken a longer time to build up by reason of the higher inductance of the field-structure magnetic circuit. Graphically, the restored armature current flux that corresponds to the initial rush of current in prior machines, upon the resumption of supply-circuit voltage, may be represented by the dot-and-dash curve X of Fig. 2A, whereby it will be seen that a relatively high flux value obtains adjacent to the motor commutator brush 2, for example, and, consequently, under such conditions, abnormally high voltages between commutator segments and resultant "flash-over" conditions are liable to occur. On the other hand, the restored armature current flux within the zone of influence of the main polar projection MP1, for example, in machines of the prior art, has assumed a relatively low value by reason of the fact that the flux that is produced by the main polar projection builds up at a comparatively rapid rate, inasmuch as the choke-coil action of the series winding is relatively small and, therefore, the armature current flux is prevented from reaching dangerous values within the zone in question.

According to our present invention, however, by reason of the above-described path of the armature-reaction or cross-field flux, the damping effect or choke-coil action of the auxiliary polar projection AP1 upon which the shunt-excited field winding AF is wound, is augmented to a material degree by the combined auxiliary polar flux and cross-field flux which act cumulatively. In the main polar projection MP1, however, the rapidly increasing polar flux is partially neutralized by the effect of the cross-field flux under consideration and, consequently, the restored armature current flux attains a materially lower value than has been the case heretofore, within the zone of influence of the auxiliary polar projection AP1, but a somewhat higher, although not undesirable, value within the zone of influence of the main polar projection MP1, as indicated by the solid-line curve Y. It will be understood that the contour of the curve Y will vary in accordance with the relative exciting fluxes of the main and the auxiliary polar projections, although, in any case, the above-described dangerously high values of restored armature current flux are effectively prevented.

Reference may now be had to Fig. 3, wherein shunt field windings for the dynamotor are dispensed with entirely, but, although two series field windings MF1 and AF1 are provided, the previously described characteristic of a field flux that varies with the machine load and a second substantially constant field flux is obtained by reason of the relative magnetic conditions of the polar projections that are associated with the main field winding MF1 and the auxiliary field winding AF1, respectively, as hereinafter more fully described.

The system shown in Fig. 3 comprises the supply-circuit conductors Trolley and Ground, a dynamotor D1 and the translating devices TD, similarly to the arrangement that is illustrated in Fig. 1, although in the present instance the main field winding MF1 and the auxiliary field winding AF1 are connected in series relation with the armature winding and that is associated with the motor commutator cylinder M across the supply circuit. If the polar projections P1 that are associated with the main field winding MF1 are considered as substantially entirely saturated under normal operating conditions, while the polar projections P2 upon which the auxiliary field winding AF1 is wound are of the usual magnetically unsaturated type, upon variations of dynamotor load of any kind, the main polar projections P1 will produce an effective flux that is substantially constant, irrespective of the variations of current in the field winding MF1; whereas, the current variation in question will cause a corresponding increase or decrease of the flux that is emitted by the auxiliary polar projections P2 which are normally in an unsaturated condition. The general compounding operation of the machine will, therefore, be similar to that set forth in connection with the system that is shown in Fig. 1, although, in the present instance, the arrangement of parts is such that the additive effect of the main and the auxiliary polar fluxes influences the armature winding that is associated with the brushes 3 and 4 of the commutator cylinder G, while the differential flux effect acts upon the armature winding that is connected to the brushes 1 and 2 which bear upon the commutator cylinder M.

In Fig. 4, the only differences from the system that is illustrated in Fig. 3, reside in a reversed arrangement of the location of the pairs of brushes 1 and 2 and 3 and 4 with respect to each other, whereby the brush arrangement corresponds to that shown in Fig. 1, and the fact that, in the system of Fig. 4, the auxiliary polar projections P2 are adapted to be substantially saturated under normal operating conditions, whereas, the main polar projections are normally in an unsaturated magnetic condition. Consequently, the auxiliary polar projections P2 emit a substantially constant effective flux, while the main polar projections P1 produce a flux that varies in accordance with the machine load conditions. The operation of the machine under consideration is, therefore, practically identical with that set forth in connection with the system that is illustrated in Fig. 1 and no further exposition of such operation is believed necessary.

It will be observed that, in the machines that are shown in Fig. 3 and Fig. 4, the same effect is obtained as when a shunt or or constantly-excited field winding is employed, but, by reason of the series connection of all of the field windings, the building-up of the field flux occurs much more rapidly than would be the case in a shunt-excited machine because of the lessened damping effect and, consequently, the entirely series-excited machines are less liable to "flash-over" conditions. The arrangement of parts that is shown in Fig. 4 will probably be found to respond more rapidly, and to be more sensitive to variations in load current than will the system that is illustrated in Fig. 3, and, for this reason, will probably be found preferable in many cases.

Referring now to Fig. 5, the structure shown comprises a stator frame SF2 having a plurality of main polar projections MP3 and MP4 that correspond to the polar projections MP1 and MP2 which are shown in Fig. 2, and a pair of auxiliary polar projections AP3 and AP4 that have their axes disposed in substantial alinement with the brushes 1 and 2 which are associated with the motor commutator M, thereby making an angle with the corresponding main polar projections that is materially less than 90 electrical degrees.

The advantages of the construction just described may be set forth as follows: In the other types of dynamotors, the primary armature winding, that is, the armature winding that is associated with either the motor or the generator commutator, is not used to as good advantage as possible because the voltage induced between the motor or the generator commutator brushes is the difference between certain positive and negative voltages that respectively correspond to the various field fluxes, thereby requiring the use of a relatively large number of conductors to consume or produce the total voltage. In the structure that is illustrated in Fig. 5, however, the auxiliary polar projections AP3 and AP4, by reason of their alinement with the brushes 1 and 2, serve as commutating poles therefor. Consequently, the auxiliary polar projections exert no direct effect upon the voltage between the brushes 1 and 2 but serve to increase the voltage between the other brushes 3 and 4 under increased machine-load conditions. The above-described structure is fully set forth and claimed in the above-identified co-pending application of R. E. Hellmund, but, in that invention, a shunt excitation for the main polar projections was provided. In accordance with our present improvement, a plurality of series-connected field windings, such as those illustrated in Fig. 3 and Fig. 4, are to be employed in connection with the structure that is shown in Fig. 5, and the dynamotor is rendered self-compounding in the desired manner by reason of adapting the main polar projections MP3 and MP4 to be normally highly saturated, whereas, the auxiliary polar projections AP3 and AP4 are normally in a relatively unsaturated magnetic condition, similarly to the machine that is illustrated in Fig. 3.

In Fig. 6, the high-voltage or motor commutator end of a commercial machine constructed in accordance with our invention is illustrated. The machine comprises a suitable stator frame or yoke SF3 which is provided with a pair of appropriate feet or bases 20 and 21 and with four main polar projections and field coils therefor, designated as MP5, MP6, MP7 and MP8, respectively and four auxiliary or commutating polar projections and field coils that are alternately disposed with respect to the main field coils and are respectively indicated by the characters AP5, AP6, AP7 and AP8. The relative polarities of the various polar projections are indicated by letters $n$, $s$, $n'$ and $s'$, in accordance with the nomenclature that was adapted in connection with the system of Fig. 2. Since the illustrated machine is of the four-pole type, the brushes 1 and 2 are disposed substantially 90 mechanical degrees apart, as will be understood, and a corresponding disposition of the generator commutator brushes (not shown) is to be made.

Following out the field-winding connections, the circuit of the main field winding comprises a pair of parallel-related wires 22, one of the main field coils MP5, wires 23, the field coil MP6 which is connected in reversed-circuit relation to the field coil MP5 in order to produce a magnetic pole of different sign, wires 24, field coil MP7, which correspond in polarity to coil MP5, wires 25, field coil MP8, which is disposed oppositely to, and connected in circuit similarly to, the field coil MP6 and conductors 26. The auxiliary field-winding circuit may be traced from wire 27 to a T-connection 28, and thence through field coil AP5, wire 29, field coil AP6 which has its connections reversed with respect to coil AP5 in order to produce the desired reversed polarity, wire 30, field coil AP7 which is disposed oppositely to, and is connected in circuit similarly to, field coil AP5, wire 31, field coil AP8 and wire 32. A further connection is made from the T-connection 28 through wire 33 to the brush 1 of the motor commutator cylinder M and the other brush 2 thereof is suitably associated with a wire 34. It will be understood that the main and the auxiliary field coils may be connected to the external circuit in any desired and suitable manner in accordance with the previously described systems. Moreover, in some instances, it may be desirable to connect the auxiliary field windings of the series type in series relation with the generator commutator G, instead of in series relation with the motor commutator M; also to energize the shunt field windings from the low-voltage cylinder G.

We do not wish to be restricted to the specific circuit connections or location and arrangement of parts herein set forth, as various modifications thereof may be effected without departing from the spirit and scope of our invention. We desire, therefore, that only such limitations shall be imposed as are indicated in the appended claims.

We claim as our invention:

1. In a dynamo-electric machine, the combination with a rotor having a plurality of commutators, of a plurality of spaced sets of brushes for said commutators, and a stator having pairs of main and of auxiliary polar projections of the same sign disposed intermediate certain corresponding brushes, one of said pairs of projections being normally saturated so as to emit a substantially constant flux.

2. In a dynamo-electric machine, the combination with a rotor having a motor and a generator commutator, of a stator having pairs of main and of auxiliary polar projections of the same sign disposed intermediate certain corresponding brushes, one of said pairs of projections being normally saturated so as to emit a substantially constant flux, the forward or toe portions of the brushes for the motor commutator being disposed adjacent to said saturated polar projections.

In testimony whereof we have hereunto subscribed our names this 29th day of April, 1916.

RUDOLF E. HELLMUND.
RALPH E. FERRIS.